United States Patent
Sakakura et al.

(10) Patent No.: US 11,929,586 B2
(45) Date of Patent: Mar. 12, 2024

(54) METHOD OF PULSED LASER IRRADIATION WITH REDUCED THERMAL DAMAGE

(71) Applicant: University of Southampton, Southampton (GB)

(72) Inventors: Masaaki Sakakura, Cambridge (GB); Yanhao Yu, Changchun (CN); Peter Kazansky, Southampton (GB); Lei Wang, Changchun (CN)

(73) Assignee: University of Southampton, Southampton (GB)

( * ) Notice: Subject to any disclaimer, the term of this patent is extended or adjusted under 35 U.S.C. 154(b) by 598 days.

(21) Appl. No.: 17/181,414

(22) Filed: Feb. 22, 2021

(65) Prior Publication Data
US 2021/0265797 A1 Aug. 26, 2021

(30) Foreign Application Priority Data
Feb. 26, 2020 (GB) .................................... 2002682

(51) Int. Cl.
*H01S 3/00* (2006.01)
*B23K 26/0622* (2014.01)

(52) U.S. Cl.
CPC ........ *H01S 3/0057* (2013.01); *B23K 26/0624* (2015.10)

(58) Field of Classification Search
CPC . H01S 3/0057; H01S 3/0007; B23K 26/0624; B23K 2103/54; B23K 26/355; B82Y 20/00; B82Y 40/00; G02B 5/3083
See application file for complete search history.

(56) References Cited

U.S. PATENT DOCUMENTS

| 2006/0169677 A1 | 8/2006 | Deshi |
| 2008/0015662 A1 | 1/2008 | Tunnermann et al. |
| 2009/0034924 A1* | 2/2009 | Figotin ................. B82Y 20/00 385/129 |

(Continued)

FOREIGN PATENT DOCUMENTS

| GB | 2490502 A | 11/2012 |
| WO | 2019158910 | 8/2019 |

OTHER PUBLICATIONS

P. G. Kazansky, H. Inouye, T. Mitsuyu, K. Miura, J. Qiu, K. Hirao, and F. Starrost, "Anomalous Anisotropic Light Scattering in Ge-Doped Silica Glass," Phys. Rev. Lett., Mar. 8, 1999, vol. 82, p. 2199-2202.

(Continued)

*Primary Examiner* — Andrew Sasinowski
(74) *Attorney, Agent, or Firm* — Renner, Otto, Boisselle & Sklar LLP

(57) ABSTRACT

A method of delivering optical energy to a substrate comprises applying a temporal group of optical pulses to a region of the substrate, wherein the temporal group comprises twenty or fewer pulses of a femtosecond pulse duration, arranged as a first subgroup of pulses comprising up to three pulses followed by a second subgroup of pulses comprising the remaining pulses in the temporal group; and wherein energies of the pulses are controlled such that pulses in the first subgroup have a first energy per pulse and pulses in a second subgroup of pulses have a second energy per pulse which is less than the first energy.

22 Claims, 8 Drawing Sheets

(56) References Cited

U.S. PATENT DOCUMENTS

2013/0336345 A1* 12/2013 Kim ..................... H01S 3/07
372/39
2014/0312469 A1 10/2014 Shah et al.

OTHER PUBLICATIONS

J. Zhang, M. Gecevičius, M. Beresna, P.G. Kazansky, "Seemingly Unlimited Lifetime Data Storage in Nanostructured Glass," Phys. Rev. Lett., Jan. 24, 2014, vol. 112(3), p. 33901.
E. Bricchi, B.G. Klappauf, P.G. Kazansky, "Form birefringence and negative index change created by femtosecond direct writing in transparent materials," Opt. Lett., Jan. 1, 2004, vol. 29, p. 119-121.
S.S. Fedotov, A. G. Okhrimchuk, A. S. Lipatiev, A. A. Stepko, K. I. Piyanzina, G. Y. Shakhgildyan, M. Y. Presniakov, I. S. Glebov, S. V. Lotarev, and V. N. Sigaev, 3-bit writing of information in nanoporous glass by a single sub-microsecond burst of femtosecond pulses, Opt. Lett., Feb. 15, 2018, vol. 43(4), p. 851-854.
U.K. Search Report, issued in Application No. GB2002682.9, dated Jul. 30, 2020.
J. Zhang et al., "Current Trends in Multi-Dimensional Optical Data Storage Technology," 2016, Asia Communications Conf. (ACP) Wuhan, China 2016, p. 1-3.

\* cited by examiner

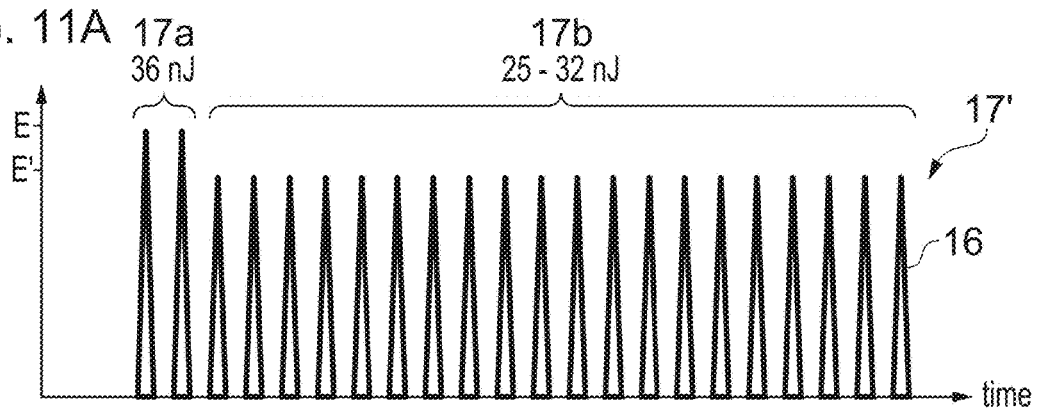
FIG. 11A
FIG. 11B
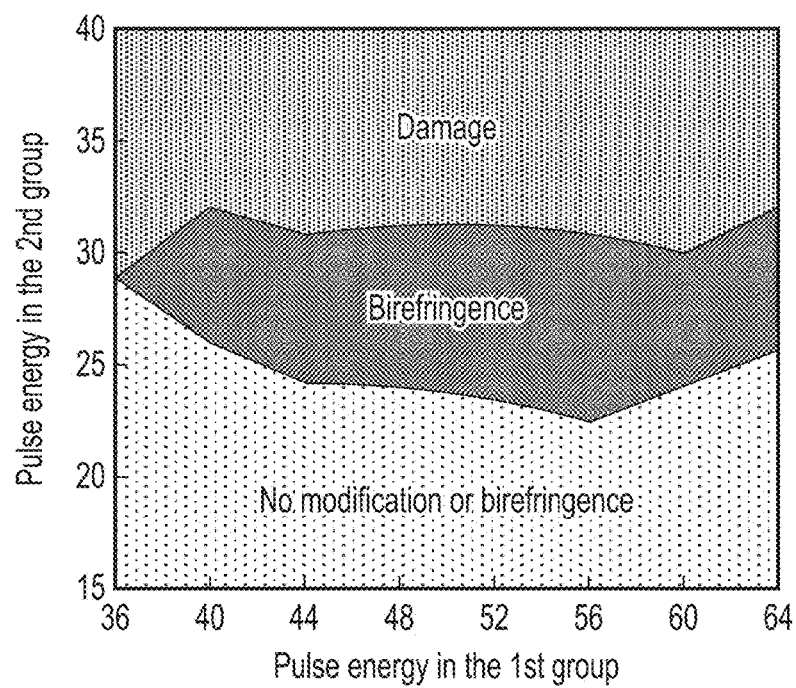
FIG. 12

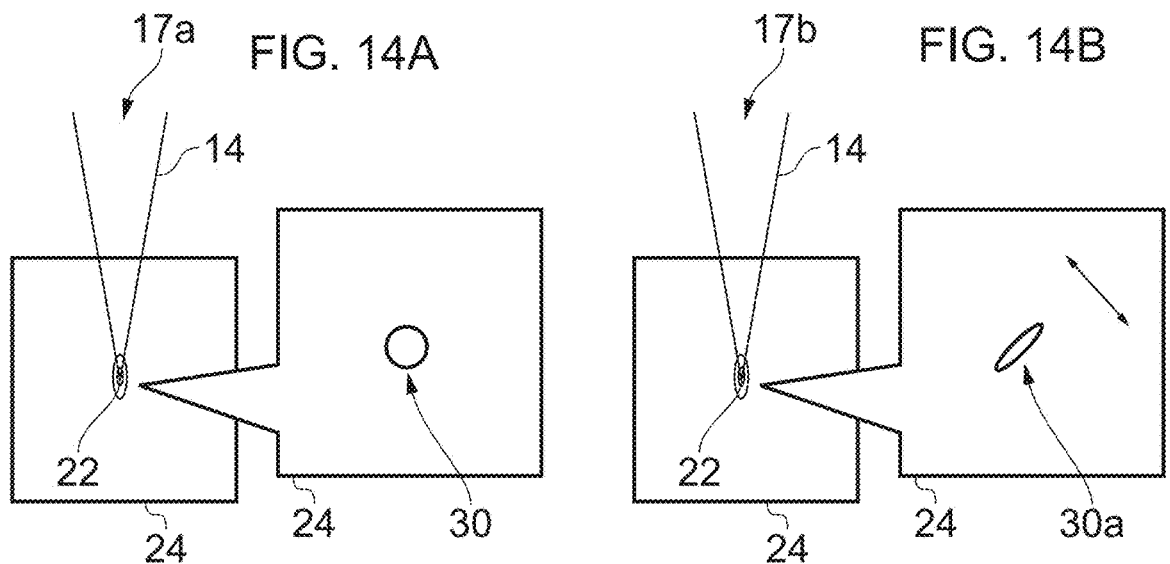
FIG. 14A
FIG. 14B
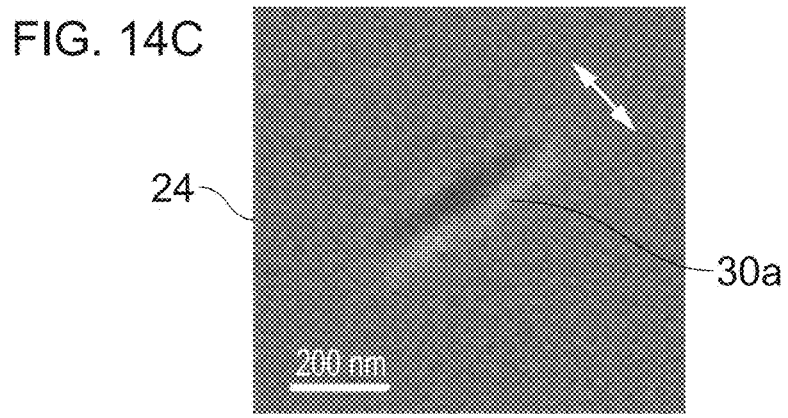
FIG. 14C
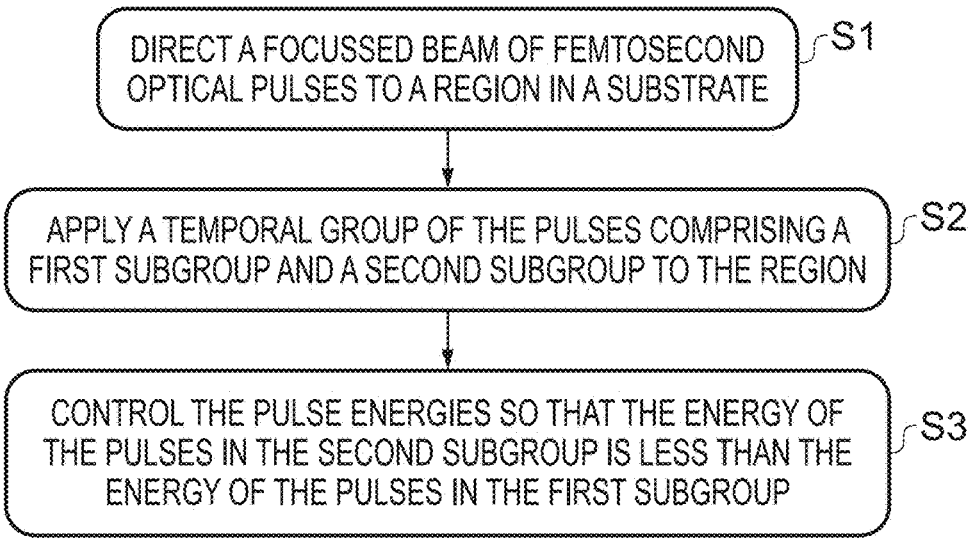
FIG. 15

METHOD OF PULSED LASER IRRADIATION WITH REDUCED THERMAL DAMAGE

BACKGROUND OF THE INVENTION

The present invention relates to a method of irradiating or exposing a substrate to pulsed laser radiation, such as to form birefringent nanostructures, that allows a reduction in thermal damage of the substrate.

A class of optical materials comprises transparent substrates internally structured with anisotropic nanostructures that give birefringent properties to the material. Formation of such anisotropic sub-wavelength structures was first reported in 1999 [1]. The nanostructure is formed by irradiating the substrate material, such as silica glass, with ultrashort pulses of laser light. Nanostructuring can be used to write data into the substrate, enabling highly effective data storage [2]. A nanostructure is made up of individual nanopores or voids with an anisotropic shape, or assembled and aligned into a grating format. These features give the nanostructure an overall birefringence with an optical retardance value and a slow axis of birefringence. The retardance and the slow axis orientation can be controlled by selection of the quantity and properties (in particular the polarisation) of the laser pulses used to create the nanopores. Hence, by forming one or more nanostructures in a particular position using focussed laser pulses, a data voxel with five degrees of freedom can be created: the three spatial dimensions corresponding to the voxel's position within the substrate, plus the retardance and slow axis values [3]. Data can be encoded in closely spaced voxels by choosing values for these five properties, which offers a large data capacity. Values up to 30 TB/cm$^3$ are anticipated as achievable. Data accessibility is high because of the transparency of the substrate material. Significantly, data written in this way is expected to have an almost unlimited lifetime (estimated at longer than $10^{10}$ years at 426 K). Such so-called 5D optical data storage is therefore an attractive option for meeting the demands of modern data storage, which requires durability, high capacity, and ease of accessibility in order to accurately preserve extensive digital data far into the future.

In order for 5D data storage to become a widespread solution, the writing of the data should be via an efficient and accurate process. In particular, the speed of the data writing is of interest, and preferably should be as fast as possible while providing consistent quality. To achieve a high speed, the writing can be performed by directing the focussed laser pulses to each required voxel position by scanning or translating the beam of laser pulses relative to the substrate, a plurality of pulses being delivered at each position in order to write a voxel. Initially proposed writing methods use a plurality of linearly or elliptically polarised pulses directed at the same position in the substrate to write each voxel by forming the required birefringence [4]. The speed of writing is limited by the time needed to deliver the multiple pulses plus the need for careful positioning of the beam relative to the substrate to ensure that all pulses for a particular voxel are delivered to the same position. The pulse delivery time per voxel depends on the repetition rate of the laser pulses, but if this is increased too much in order to reduce the time, thermal damage occurs in the substrate which reduces the voxel quality.

Accordingly, techniques able to increase the speed of delivering pulsed laser irradiation to multiple locations in a substrate, for example to create anisotropic, birefringent, nanopores, are of interest.

SUMMARY OF THE INVENTION

Aspects and embodiments are set out in the appended claims.

According to an aspect of certain embodiments described herein, there is provided a method of delivering optical energy to a substrate, comprising: applying a temporal group of optical pulses to a region of the substrate, wherein the temporal group comprises twenty or fewer pulses of a femtosecond pulse duration, arranged as a first subgroup of pulses comprising up to three pulses followed by a second subgroup of pulses comprising the remaining pulses in the temporal group; and wherein energies of the pulses are controlled such that pulses in the first subgroup have a first energy per pulse and pulses in a second subgroup of pulses have a second energy per pulse which is less than the first energy.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, methods may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which:

FIG. 11A shows a temporal profile of a pulse energy modulated group of optical pulses according to an example method, and FIG. 11B shows a retardance image of birefringence in a substrate written with nanostructures using different energy pulse groups configured as in FIG. 11A;

FIG. 12 shows a graph of pulse energy relationships between higher and lower pulse energies in pulse energy modulated pulse groups, with regions of the resulting outcome in a substrate for different energies;

FIGS. 14A and 14B shows schematic representations of a substrate into which a birefringent nanovoid is written according to an example method, at different stages of the method;

FIG. 14C shows a scanning electron microscope image of a substrate into which a birefringent nanovoid has been written; and FIG. 15 shows a flow chart of steps in an example method according to the present disclosure.

DETAILED DESCRIPTION

Figure 1:
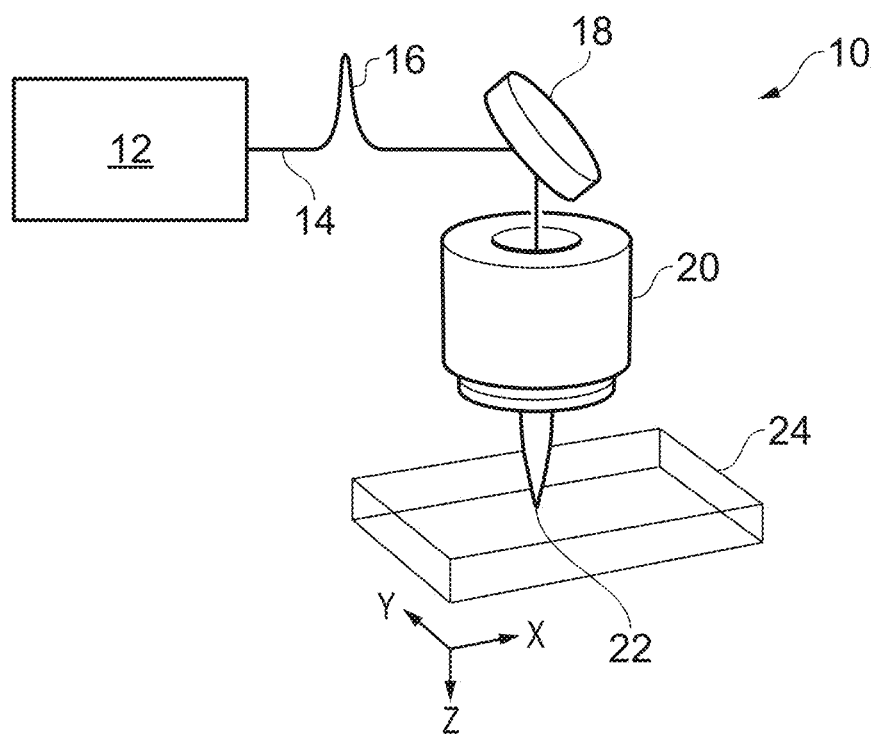
FIG. 1 shows a perspective schematic representation of an example apparatus suitable for carrying out a method according to an example of the present disclosure.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of methods discussed herein which are not described in detail may be implemented in accordance with any conventional techniques for implementing such aspects and features.

Embodiments of the present disclosure relate to methods for irradiating a substrate with laser pulses. As a particular example, the fabrication of nanostructured optical elements will be discussed. This application uses pulsed laser irradiation to form birefringent nanostructures in optical elements, for example elements for optically storing data or elements that use the geometric phase effect to modify the polarisation and/or phase of light. In the present disclosure, the term "optical element" refers to a substrate of appropriate material patterned with a nanostructure as described for optical use, regardless of the nature of the intended application, use or purpose of the nanostructured material. Such applications may or may not relate to data storage or make use of the geometric phase. Other applications in which laser pulses are applied to a substrate may also benefit from the proposed methods; these include, for example, direct laser writing into substrates for the formation of other types of structure, such as waveguides, and other laser processing techniques such as cutting and welding.

Optical elements comprising one or more nanostructures induced in a suitable material such as glass using an incident ultrashort (ultrafast) pulsed laser beam have significant application as optical data storage elements. The nanostructures of the optical element comprise a collection of nanopores or nanovoids in a periodic or random distribution in an optically transparent material, such as silica glass. The nanopores are nanometre-scale structural modifications or changes in the bulk material. Although not yet well understood, the nanopores are considered to be nanometre-scale voids created in the bulk material by the action of the incident laser pulses, and have a shape and orientation that depends on the optical properties of the laser pulses, and which confer the birefringent properties to the material.

Laser-induced writing processes for creating the nanostructures comprise scanning or writing an ultrashort pulsed focussed laser beam over the material intended for the optical element, and are performed to deliver sufficient energy to create a nanostructure of a required type. Some nanostructures have the form of nanogratings, in which an amount of optical energy is delivered which causes the nanopores to become self-organised into a periodic distribution that acts as an optical grating, but the phenomenon is more general and includes other types of structural modification that can be induced by ultrafast laser irradiation of bulk optically transparent material, in particular silica glass. The type of structure is dependent in part on the parameters of the incident laser pulses. The structural modification is the presence of the nanopores, and is in effect a change in the material that alters its refractive index and provides a birefringence. Hence the optical properties of materials can be engineered by writing nanostructures into the material. If this is carried out in spaced-apart localised regions, the nanostructures can act as voxels to record data in the material.

To achieve the writing, a pulsed laser beam is focussed and directed at a location or moved or scanned along a path over the surface of a sample or blank of the material (a substrate) to induce the structural change in the volume of the material behind the area covered by the scan path, at a rate that can be referred to a writing speed or scan speed. The laser beam comprises femtosecond pulses, that is, pulses of duration up to about 1000 fs. Hence the structural modification induced by the energy of the incident laser pulses can be termed "femtosecond laser damage modification" (FLDM). The amount of optical energy delivered at any location depends on the scan speed, the pulse repetition rate and the energy per pulse. The type of structural modification, and the threshold of laser beam energy required to produce it, depends on factors including the laser parameters (pulse duration, pulse energy, pulse repetition rate, and wavelength), the numerical aperture of a lens or other focussing arrangement used to focus the beam onto or into the material substrate, and the properties of the material itself (including band gap and thermal properties).

Various types of structural modification have been defined, some of which correspond to useful birefringent nanostructures, suitable for writing voxels for data storage. One example, obtained from an intermediate energy range, is a type II modification, which is a form birefringence associated with nanogratings formed of nanopores self-assembled into a periodic array providing an anisotropic refractive index pattern with a negative refractive index change. A further example has been designated as type X

[5]; this can have a reduced optical propagation loss compared to type II structures, while still providing birefringence. Typically, a high pulse density delivered at a slow writing speed is used to minimise loss in type II structures since this allows an improved quality of the self-assembled nanostructure. Type X structures can be written using a contrary approach of reduced pulse density, for example delivered by increasing the writing speed (and hence a reduction in the total energy delivered to the material), and can show a significantly reduced loss compared to type II nanogratings. A type X modification comprises randomly distributed individual nanopores, arranged without any discernible periodicity or pattern. The spacing between adjacent nanopores is random, and the individual nanopores are positioned at random in a layer within the thickness of the bulk material. Periodicity of nanostructures (as in type II) is not required to provide birefringence, however, and in type X this property depends on the orientation of the individual structures within the bulk material. A further type of structural modification comprises a single nanoplane formed with its surface perpendicular to the direction of polarisation of the light used to create it. This is considered to be a precursor of type II.

For both type II and type X, the anisotropy providing the birefringence is strongly dependent on, and can be controlled by, the polarisation of the laser writing beam. In type X at least, each nanopore has an anisotropy defined by its shape, which can be understood an oblate spheroid (ellipsoid) shape, or lenticular shape. As noted, the nanopores are randomly spaced apart within the substrate material, although lying generally within a layer at a constant depth behind the optical input surface of the optical element. More than one layer may be written depending on the intended use of the optical element; 5D data storage may use multiple layers, for example, each being a layer of voxels in a 3D array, and the nanopores within each layer being grouped into separate voxels. Each voxel comprises a plurality of nanopores which may have substantially the same or a similar size, shape and orientation, and the average orientation of the nanopores in a voxel is determined by the polarisation orientation of the writing pulses. These properties are varied between voxels in order to encode data via differences in the retardance and the slow axis. The oblate spheroid shape of each nanopore is oriented with the plane of its circular cross-section parallel to the optical propagation direction through the optical element and perpendicular to the input surface of the optical element (the surface scanned by the writing beam). The elliptical or oval cross-section which is parallel to the input surface can be oriented with its major axis at any angle, where the major axis is formed perpendicular to the polarisation of the writing light beam. The minor axis is parallel to the polarisation of the writing light beam. The overall shape of the nanostructure is determined by the intensity distribution of the laser pulses near the focal point.

Note that in the present disclosure, the term "nanostructure" may refer to individual structures (nanopores) within a nanograting (the nanograting is a collection of nanostructures or nanopores), or may refer to the overall structural modification making up a nanograting or other pattern of laser-induced structural modification (the nanograting is itself a nanostructure which is formed from nanopores). "Structure" and "nanostructure" may be used interchangeably, except if specifically indicated otherwise, or clear from the context. The term "nanostructure" indicates a structure with dimensions on the nanometre scale (i.e. 1000 nm or less, typically much less), which can also be considered as "sub-wavelength" structures in that the dimensions are smaller than the wavelength of light with which the optical element is fabricated and for which the optical element is designed. Each nanopore is an individual structural modification on the nanometre scale, in the form of a void in the bulk material that has a shape and orientation defined by the properties of the writing laser pulses. A nanopore may also be referred to as a nanovoid.

Either type II or type X modifications can be used as birefringent nanostructures suitable as voxels for encoding data into a substrate. Each nanostructure can be written by focussing a plurality of ultrashort laser pulses to a desired location in the substrate material in order to create a consistent and uniform birefringence. Depending on the laser pulse characteristics, a group of at least six pulses is typically required, with some writing techniques using many more pulses, such as 10, 50 or 100. At least one pulse in the group is polarised, often linearly polarised, with the polarisation direction chosen to give the nanostructure a desired anisotropic character and corresponding birefringence. In the case of type II, the polarisation defines the alignment of the nanograting, while for type X, the polarisation changes initially spherical nanopores into an oblate spheroidal shape with a longer dimension oriented perpendicular to the polarisation direction of the laser light, to achieve the optical anisotropy. In this way, the orientation of the slow axis of the birefringence of a nanostructure can be set by selecting the orientation of the polarisation of the writing pulses, also referred to as the azimuth. The magnitude of the retardance provided by the birefringence can be set at least in part by the total number of pulses and the energy per pulse, combining to give a total optical energy delivered at the desired location. Hence, the slow axis orientation and the retardance can be specified for each voxel in order to write data into a substrate by moving a pulsed laser beam across a substrate.

FIG. 1 shows a highly simplified schematic representation of an example apparatus suitable for carrying out the irradiation of a substrate with ultrashort laser pulses, for example in order to create nanostructures in the substrate. An optical source 12 comprises a laser configured to emit a beam 14 of laser light in the form of ultrashort pulses 16, having a duration of about 1000 fs or less. The source 112 emits the pulses 16 at a particular repetition rate, being the number of pulses emitted per second. The beam 14 of pulses 16 is directed by an optical arrangement 18, depicted as a simple mirror but which may contain a variety of bulk optical components including mirrors and lenses, to an objective lens 20 which is configured to direct the beam 14 substantially perpendicularly to the surface of a planar substrate 24, and to focus the beam 14 to a focussed spot or focal region or point 22. The spot 22 is arranged at the surface or below the surface within the bulk of the substrate 24, which in this example comprises a transparent material such as silica glass, suitable for the fabrication of a nanostructured optical element. The substrate 24 is arranged on a translation stage (not shown) so that it can be translated in the X and Y directions in a plane perpendicular to the incident beam direction, thereby allowing relative movement between the spot 22 and the substrate 24 so the spot 22 can be directed to different positions on or in the substrate 24 parallel to the substrate surface. The depth of the spot 22 within the thickness of the substrate 24 (the direction Z parallel to the beam propagation direction) can be adjusted using the lens 20 or by vertical movement of the substrate 24 in order to deliver pulses to different positions through the substrate thickness. In this way, pulses 16 can be directed to any position in the substrate, for example to write an array of voxels in three dimensions.

As described above, the pulses can be configured with regard to characteristics such as pulse energy, duration, repetition rate and wavelength in order to deliver an amount of optical energy to a selected position in the substrate to create a nanostructured region of a chosen type. Both type II and type X nanostructures are anisotropic and hence exhibit birefringence, and are therefore suitable for recording data when arranged as an array of voxels within the substrate.

Figure 2:
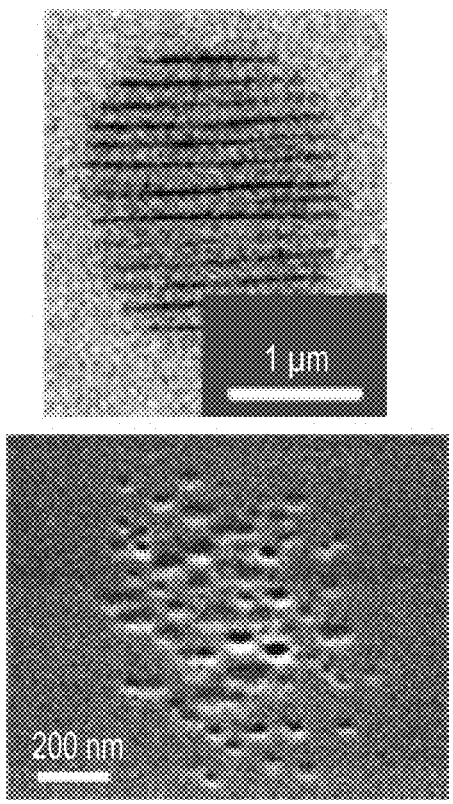
FIG. 2 shows scanning electron microscope images of silica substrates with birefringent nanostructures such as can be formed using methods according to the present disclosure.

FIG. 2 shows scanning electron microscope images of example nanostructures. The upper image shows a type II nanostructure, comprising nanopores self-assembled into a grating. The lower images shows a type X nanostructure, comprising a randomly distributed group of elongated (oblate spheroidal) nanopores.

Figure 3:
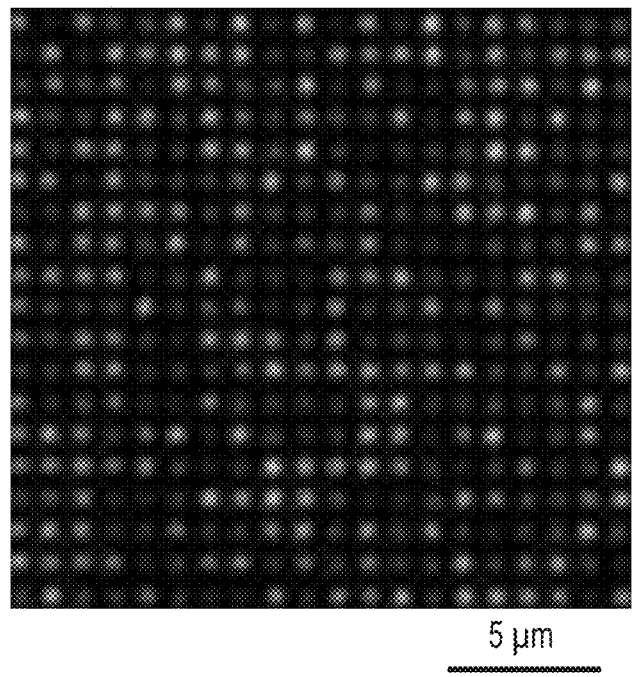
FIG. 3 shows a birefringent image of a silica substrate with an array of birefringent nanostructures therein such as can be formed using methods according to the present disclosure.

FIG. 3 shows a birefringence image of a regular array of birefringent nanostructures, or "dots" written inside a silica substrate. The dots are spaced apart by about 1 μm (centre to centre), and are written so as to have different birefringent properties by adjustment of the optical pulses. Hence, data can be encoded into the dots, and the dots comprise a voxel array. Different colours of the dots (not shown in the black and white image) indicate different orientations of the birefringence optical slow axis, and different brightnesses, which can result in different perceived diameters of the dots, correspond to different values of birefringent optical retardance.

A useful approach for writing an array of voxels, thereby recording data into the substrate, is to continuously translate the substrate relative to the incident beam of pulses and the focal spot to which they are focussed following a scan path that takes in each desired voxel position, and activate the laser to emit a burst or group of pulses when the incident focal spot coincides with a desired voxel position. In the example of FIG. 3, therefore, a group of pulses is emitted at 1 μm intervals along the scan path. Each group of pulses, which may comprise a minimum of six pulses, for example (although the number of pulses might vary between voxels) has its characteristics (in particular polarisation orientation) set according to the birefringence values required for that particular voxel.

It is desirable that the data writing speed be as high as possible in order to maximise the efficiency of data recordal. Accordingly, the translation of the substrate is made to be continuous; the substrate is not halted when the focal spot reaches a voxel position. Rather, the substrate continues moving while the group of pulses is delivered. The individual pulses are therefore not all delivered to the exact same location. Instead they are incident typically at overlapping locations, each shifted along the scan direction relative to the previous location, so that the total area exposed to the optical energy is smeared out slightly compared to the size of the focal spot. Typically, the pulse repetition rate available from an ultrafast laser producing femtosecond pulses is sufficiently high that the required number of pulses can be emitted in a short enough time period for the pulses in a group to overlap sufficiently in order to form the nanostructure. This is particularly true if the scanning speed or translation speed is limited accordingly so that the substrate does not move too far during the pulse group delivery time period.

From this it can be appreciated that the data writing/recording speed, which is desired to be as high as possible, is limited by the translation speed of the substrate in combination with the repetition rate of the laser pulses, for a chosen voxel spacing. The translation speed must allow enough pulses for the formation of a distinct birefringent nanostructure to be delivered at a single voxel position. If the translation speed is too fast, there is too much shift between successive pulses in a group. This reduced overlap decreases the magnitude and accuracy of the birefringence of the nanostructure, which in turn decreases the accuracy of the data recordal.

Figure 4:
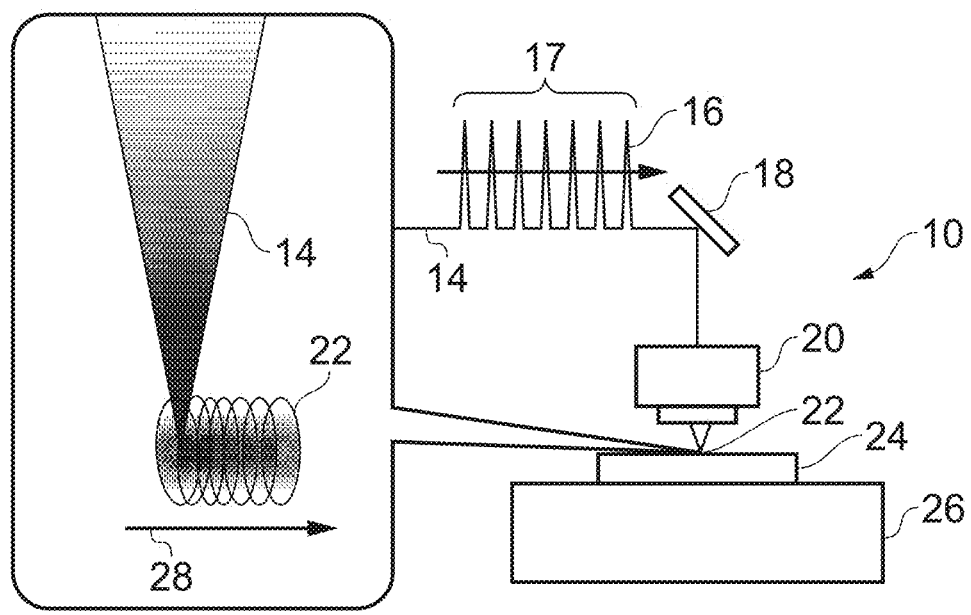
FIG. 4 shows a schematic representation an example apparatus suitable for carrying out example methods of the present disclosure and known methods.

FIG. 4 shows a schematic representation of an example data writing apparatus similar to the apparatus in FIG. 1, in order to illustrate this issue. The beam 14 comprises laser pulses 16 arranged into a group 17, in this example comprising seven pulses. The pulse group 17 may be described as a temporal group, in that the pulses are spaced apart in time with a temporal separation defined by a pulse repetition rate. The pulse group 17 is directed onto the substrate 24 at a focal spot 22, and the substrate 24 is mounted on a translation stage 26 for movement relative to the focal spot 22, as described above. The inset on the left of FIG. 4 shows an enlarged depiction of the beam 14 focussed to the focal spot 22. During the time period for delivery of all the pulses 16 in the group 17, the continuous translation of the substrate 24, indicated by the arrow 28, means that the focal spot 22 at each successive pulse is shifted along the translation direction relative to that for the previous pulse. Hence the region of the substrate 24 exposed to the optical energy of the pulse group 17 is larger than the volume of the focal spot 22, and the energy density delivered to the substrate 24 for formation of that voxel is reduced. The achievable accuracy for the birefringence recorded in the voxel is reduced correspondingly. This effect is exacerbated by increasing the translation speed.

Figure 5:
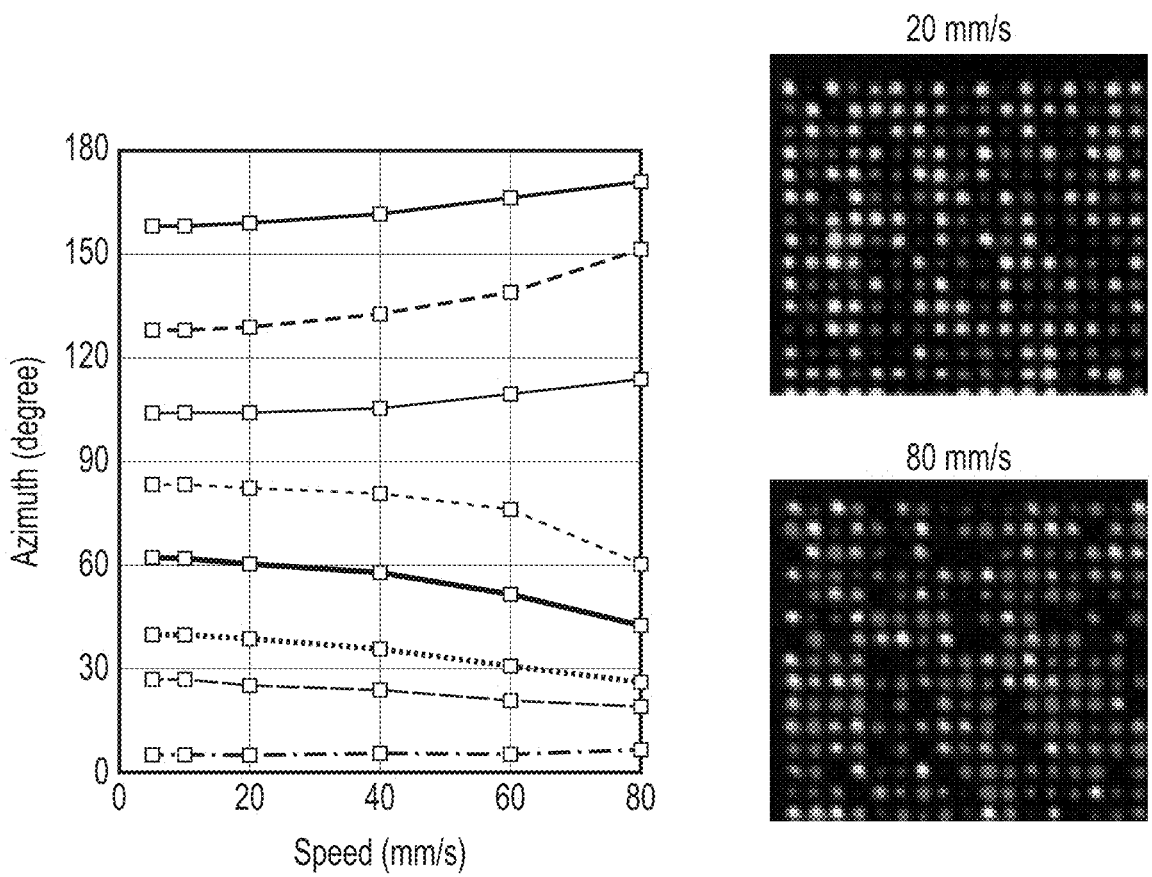
FIG. 5 shows a graph of the birefringence slow axis azimuth of nanostructures written into substrates using known methods, for increasing speed of writing multiple nanostructures, together with birefringence images of substrates with nanostructures written at an example relatively slow speed and an example relatively fast speed.

FIG. 5 shows a graph of measured birefringent slow axis orientation (azimuth, vertical axis) of dots written into silica glass, at different values of translation speed (horizontal axis). Dots with different values of intended birefringence azimuth ranging from 0° to 160° were recorded at a range of translation speeds from 5 mm/s to 80 mm/s. As can be seen, the azimuth values remain reasonably accurate at lower translation speeds. However, as the speed is increased, the azimuth values increasingly deviate from the values achieved at low speed (the intended value). This decrease in birefringence accuracy arises from the smearing out of the successive pulse delivery positions depicted in FIG. 4, which increases with increasing scan speed. The dots were written as a laser pulse repetition rate of 1 MHz. The graph indicates that for translation speeds above about 50 or 60 mm/s, the azimuth deviation becomes very large, and likely above a tolerable error. Hence, for a voxel separation of 1 μm, the maximum usable data writing rate is about 50,000 to 60,000 voxels/s at a 1 MHz repetition rate.

The unsuitability of faster scan speeds can also be appreciated from the birefringence images of substrates included in the right side of FIG. 5. The upper image shows an array of dots written at a relatively slow scan speed of 20 mm/s. The achieved birefringence is clearly indicated by the bright and uniform nature of the dots. The lower image shows an array of dots written at a much faster scan speed of 80 mm/s. The brightnesses of the dots are much less uniform, indicating non-uniform birefringence because of less distinction between the birefringence slow axis orientations.

Therefore, simply increasing the scan speed or translation speed is not an effective way to increase the data writing speed or rate.

An alternative approach to increase the data writing rate is to increase the laser pulse repetition rate. This moves the pulses closer together in time, and hence reduces the overall duration of the group of pulses per voxel, for a given number of pulses per group. This corresponds to a smaller distance travelled by the substrate during the pulse group delivery time period, so the pulse focal spots are not shifted or smeared out so much, the energy density for the voxel is increased, and the birefringent properties are created more accurately. For example, extrapolation from the parameters used to produce the data in FIG. 5 indicates that increasing the pulse repetition rate by ten times, from 1 MHz to 10 MHz, should allow the maximum acceptable substrate translation speed to also increase by 10 times, from 50-60 mm/s to 500-600 mm/s, corresponding to 500,000 to 600,000 voxels/s for a 1 μm voxel spacing.

However, the maximum usable pulse repetition rate is limited by damage to the substrate caused by thermal effects. Optical energy delivered to the substrate by the pulses converts to thermal energy and causes a temperature increase of the substrate material. If the thermal energy accumulates, thermal damage occurs which reduces the accuracy of the birefringent properties of the voxels. This becomes an issue when the time interval between the laser pulses approaches the thermal diffusion time of the substrate material. The thermal energy delivered by one pulse does not have time to dissipate from the focal region before the next pulse arrives, so the thermal energy accumulates, the temperature rises, and damage takes place. The thermal diffusion time can be roughly estimated by calculating the product of the area of the photoexcited region (region exposed to the optical energy) and the reciprocal of the thermal diffusion coefficient of the material. When forming nanostructures in silica glass with a visible laser wavelength (515 nm, for example), a typical thermal diffusion time is about 250 ns, which corresponds to a maximum usable pulse repetition rate of about 4 MHz.

Figure 6:
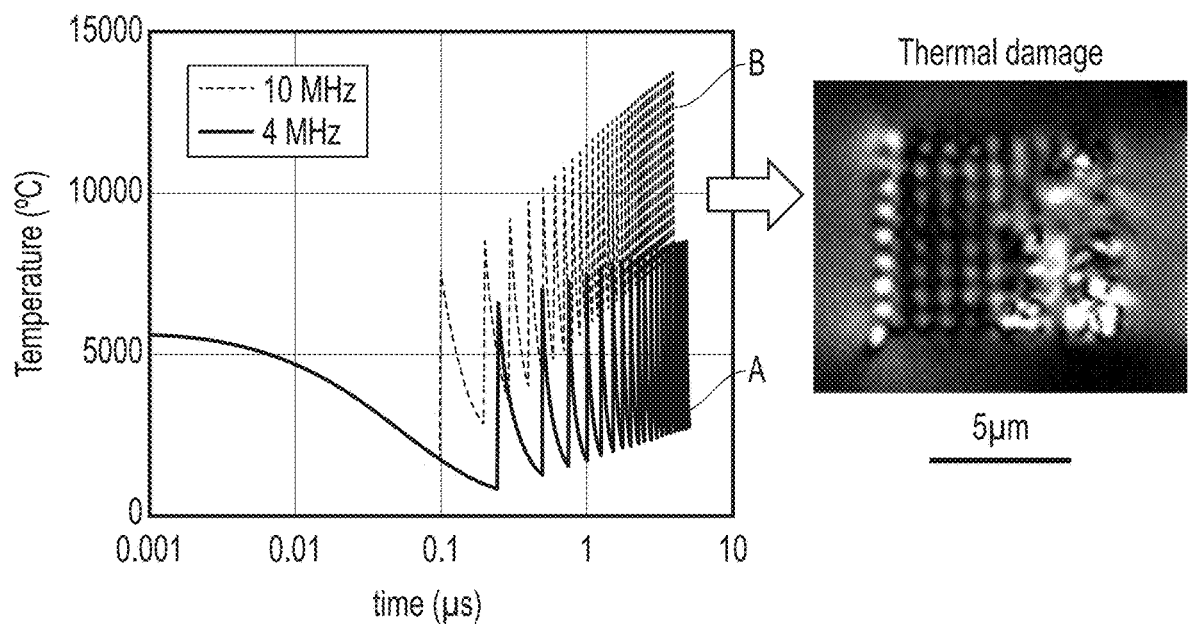
FIG. 6 shows a graph of computer modelled temperature increase inside a substrate to which optical pulses have been applied for different pulse repetition rates, and a birefringence image of a substrate written with nanostructures at a high repetition rate causing thermal damage of the substrate.

FIG. 6 shows a graph of computer-modelled temperature increases caused by delivery of ultrafast pulses into a silica glass substrate, shown as temporal profiles of the substrate temperature at the centre of the photoexcited region. The lower profile A is for a pulse repetition rate of 4 MHz, while the upper profile B is for a pulse repetition rate of 10 MHz. It can be readily appreciated that much higher substrate temperatures arise from the higher repetition rate, and the rate of temperature increase is also larger.

FIG. 6 includes, on the right-hand side, a polarisation microscope image of a region inside a silica glass substrate exposed to 22 femtosecond laser pulses delivered at a 10 MHz repetition rate. Extensive thermal damage is apparent; clearly this is contrary to the ability to write accurately configured birefringent nanostructures.

Accordingly, a simple increase in the pulse repetition rate is also not an effective way to increase the data writing rate.

The present disclosure proposes methods to enable the use of higher pulse repetition rates, offering corresponding faster data writing rates, with reduced or no thermal damage. This is achieved by controlling the energies of the pulses in a pulse group (pulse train or burst of pulses) so that pulses have different energies, in particular that the initial pulses in the group have a greater pulse energy than the later pulses in the group. This suppresses the accumulation of excess heat in the substrate, so that thermal damage is reduced or avoided. Accurate and high quality, clear voxels have been written at pulse repetition rates up to 10 MHz, and higher rates may be usable. A higher pulse repetition rate allows faster translation speeds to be used, as explained above, plus the time to deliver the same number of pulses per voxel is reduced. Both these factors allow the data writing rate to be increased. Also, profiling the pulse energies across a pulse group in this way can also allow the formation of a nanostructure with a smaller number of pulses, which also increases the data writing rate since the pulses required per voxel can be delivered in even less time.

Note that the experimental results presented below were obtained using the following common parameters: a laser wavelength of 515 nm, pulse durations in the range of 200-280 fs, a numerical aperture of 0.6 for focussing the beam of pulses into the focal region, and a voxel spacing or separation in the substrates of 1 μm. Other parameters were varied as indicated where relevant, in particular pulse repetition rate and pulse energy.

The concept of varying the pulse energy across the pulses within a group can be termed pulse energy modulation (PEM).

Initially, consider the scenario of PEM within a regime of relatively low pulse repetition rate, 1 MHz, at which thermal damage typically does not occur owing the relatively long time between pulses that allows thermal energy to dissipate.

Figure 7:
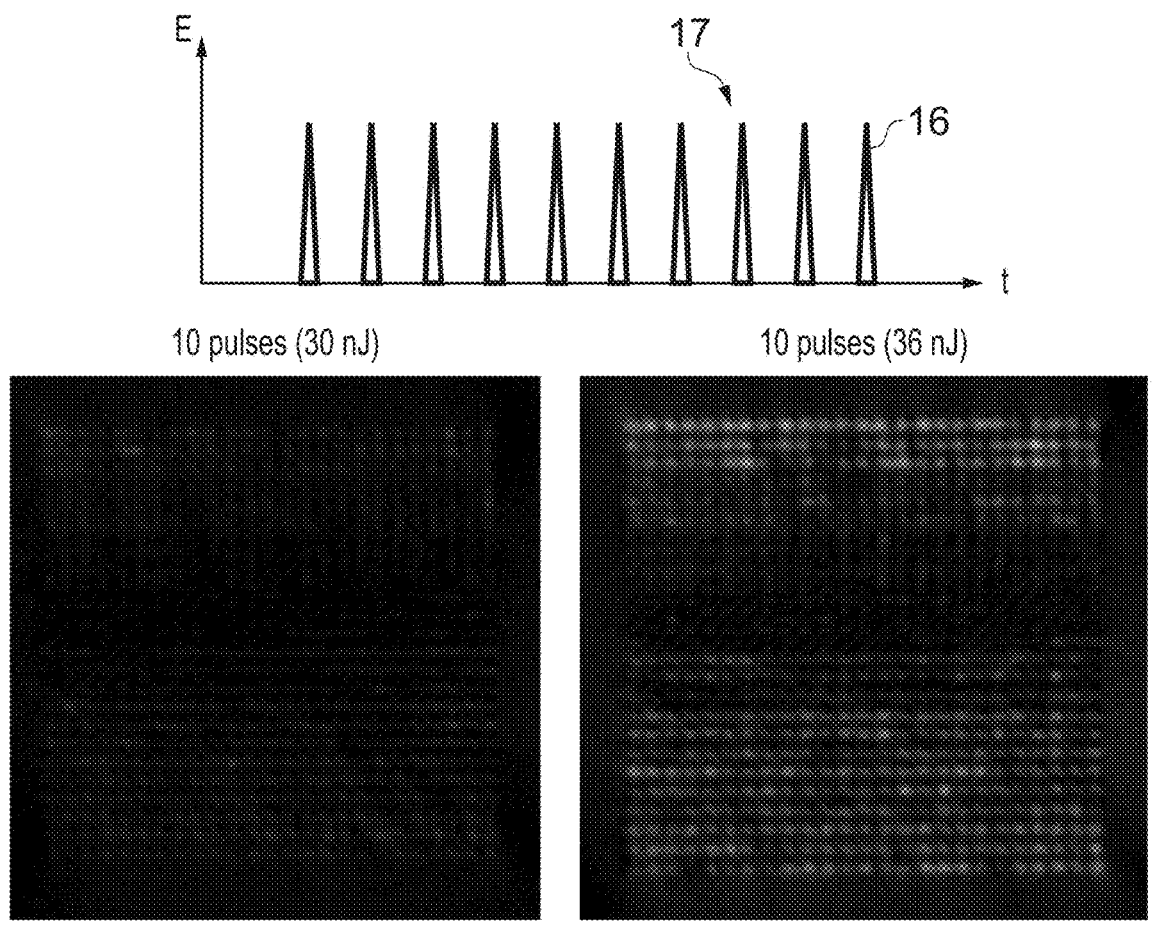
FIG. 7 shows a temporal profile of a group of optical pulses used in known methods of writing nanostructures, together with retardance images of birefringence in two substrates written with nanostructures using such a pulse train.

FIG. 7 shows data relating to 1 MHz repetition rate pulses without PEM. A group or train of pulses 17 comprised ten individual pulses 16, each with the same pulse energy E. Unmodulated pulse trains of this format were used to write arrays of voxels in silica substrates, using different values of the pulse energy E. FIG. 7 includes retardance images of birefringence in two substrates. The left image is of voxels written using 10-pulse groups with a pulse energy of 30 nJ. Very little birefringence can be seen (the dots are very faint); this level of pulse energy is insufficient in this case to create high quality nanostructures. The right image is of voxels written using 10-pulse groups with a somewhat higher pulse energy of 36 nJ. However, the dots are still poorly defined, since the increase in pulse energy is still not sufficient to create usable nanostructures. In fact, it was found that in the absence of PEM, at least 20 pulses at these pulse energies were needed in a pulse group in order to obtain birefringent dots of an acceptable quality.

Figure 8:
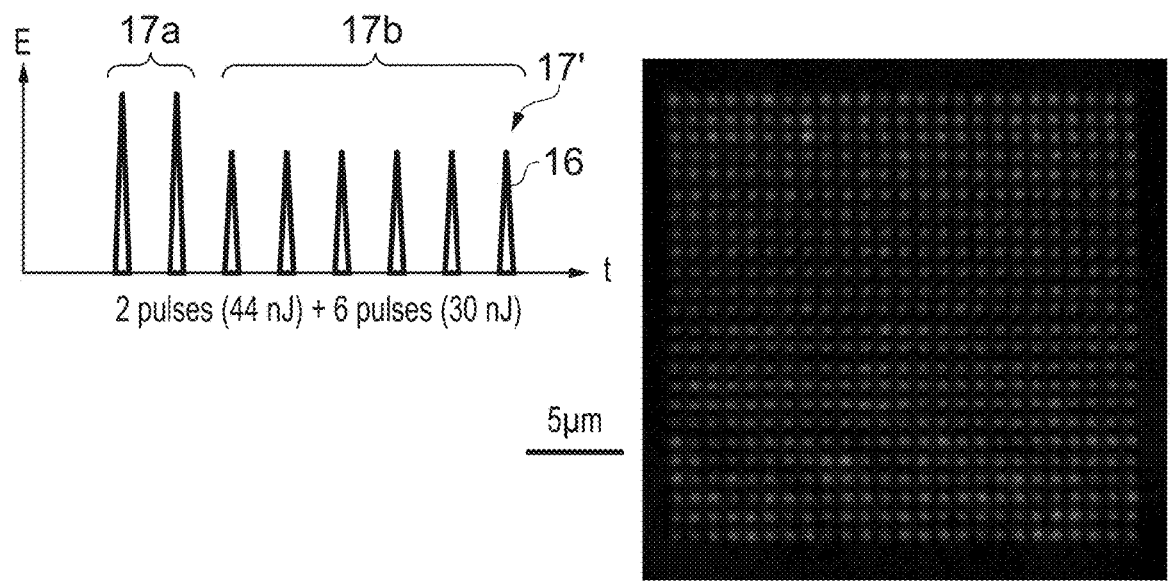
FIG. 8 shows a temporal profile of a pulse energy modulated group of optical pulses according to an example method of writing nanostructures, together with a retardance image of birefringence in a substrate written with nanostructures using such a pulse train.

FIG. 8 shows data relating to 1 MHz repetition rate pulses with PEM. A group or train of pulses 17' comprised just eight individual pulses 16. The energy of the pulses was modulated such that the first two pulses in the group 17', which we can refer to as a first subset or subgroup 17a of pulses 16 had a higher pulse energy of 44 nJ, and the remaining six pulses, which we can refer to as being comprised in a second subset or subgroup 17b of pulses 16 had a lower pulse energy of 30 nJ. Under this PEM regime it was found that the short train 17' of only eight pulses was sufficient to produce nanostructured birefringent dots of an acceptable quality, comparable with the dots obtained using a 20-pulse train without PEM. FIG. 8 includes a retardance image of birefringence in a substrate having voxels written with the depicted PEM eight-pulse train 17'. The enhanced quality and accuracy of the dots compared to those shown in FIG. 7 can be appreciated.

From this, it can be understood that PEM allows nanostructures to be successfully written using a relatively small number of pulses, provided that the energy of an initial subgroup of the pulses is sufficiently high. The remaining pulses can be of lower energy, and act to deliver optical energy to generate the birefringent properties for nanovoids initially formed by the high energy of the first few pulses.

Following from this, it has been deduced that PEM can allow the use of high pulse repetition rates for voxel writing without causing significant thermal damage. This gives access to the higher voxel writing rates which are necessary to enable optimum use of 5D optical data storage. Thermal damage is avoided by PEM owing to the reduction in pulse energy over the course of the pulse train; the later pulses deliver less energy to the substrate which allows heat accumulated from the initial high energy pulses to dissipate even if the interval between pulses is shorter than the thermal diffusion time. Also, the smaller number of pulses in the train means there is a shorter overall time period for heat accumulation so high temperatures do not have an opportunity to build up.

Figure 9:
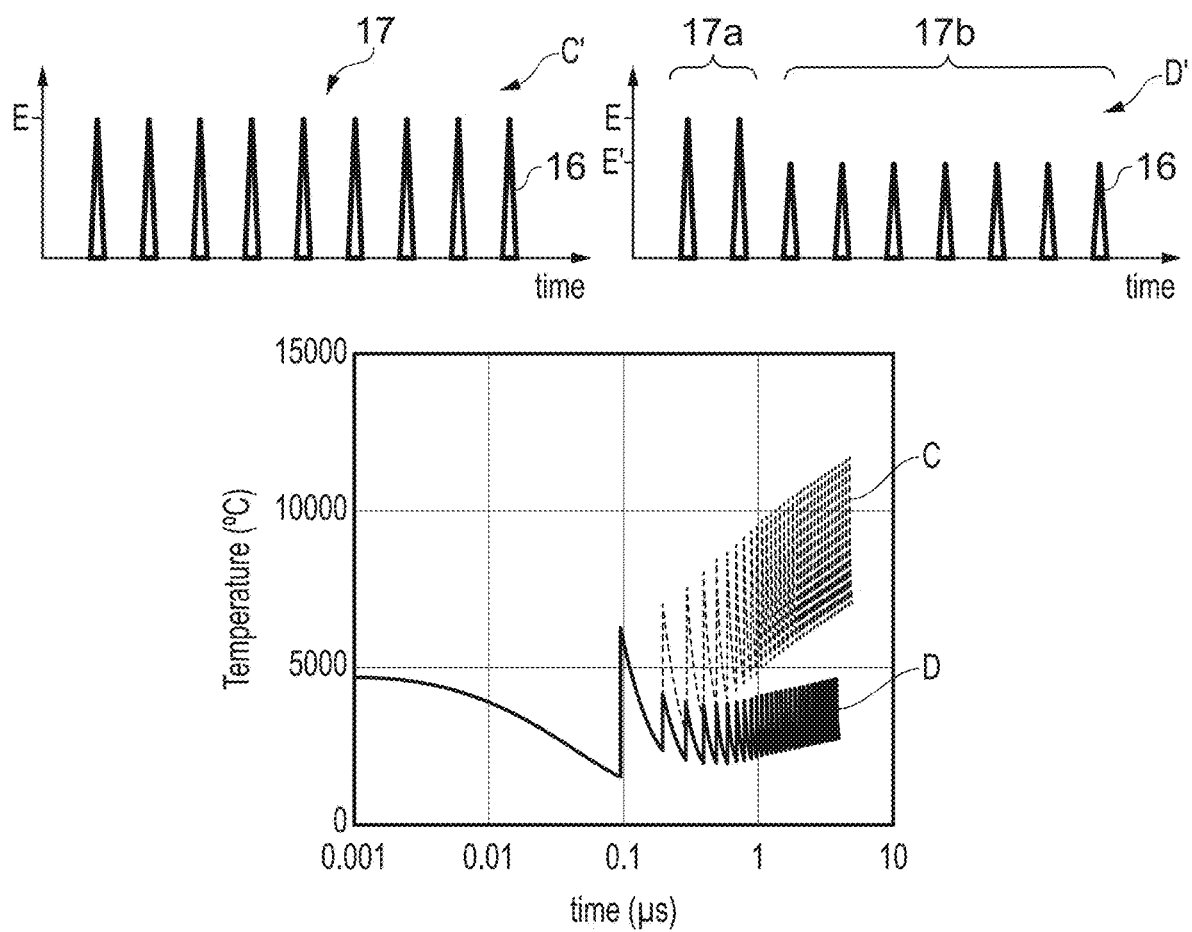
FIG. 9 shows temporal profiles of a non-pulse energy modulated group of optical pulses, and a pulse-energy modulated group of optical pulses according to an example method, and a graph of computer modelled temperature increase inside a substrate caused by the pulse groups.

FIG. 9 shows a further graph of computer-modelled temperature increases caused by delivery of ultrafast pulses into a silica glass substrate, shown as temporal profiles of the substrate temperature at the centre of the photoexcited region, to show the reduced thermal effects achievable from the use of PEM in conjunction with high pulse repetition rates. The upper profile C is for pulses at a repetition rate of 10 MHz, and delivered without PEM, in other words, every pulse has the same energy. The non-PEM pulse group is depicted as group C', being a group 17 of nine individual pulses 16, all having a pulse energy E. As expected for the high repetition rate, the temperature increase inside the silica substrate is high, which will likely lead to thermal damage (compare with curve B in FIG. 6).

The lower profile D is for pulses at the same high repetition rate of 10 MHz, but delivered with PEM. The PEM pulse group is depicted as group D', being a group 17' of nine individual pulses 16 as for the non-PEM group C'. The PEM in this example is implemented as a first subgroup 17a of two pulses with energy E (as in the non-PEM group C') and a second subgroup 17b of seven pulses with an energy E' which is less than E. The curve D shows a greatly reduced temperature increase, which will be insufficient to cause appreciable thermal damage. In this particular example, the use of PEM to reduce the energy of the pulses in the second subgroup reduces the temperature elevation caused by heat accumulation in the substrate by about four times compared with the temperature resulting from non-PEM pulses.

Accordingly, it is apparent that pulse energy modulation can be applied to pulse trains for nanostructure writing in order to avoid thermal damage while allowing the use of high pulse repetition rates to increase data writing rates.

A variety of experiments have been conducted to demonstrate the concept.

Figure 10A:
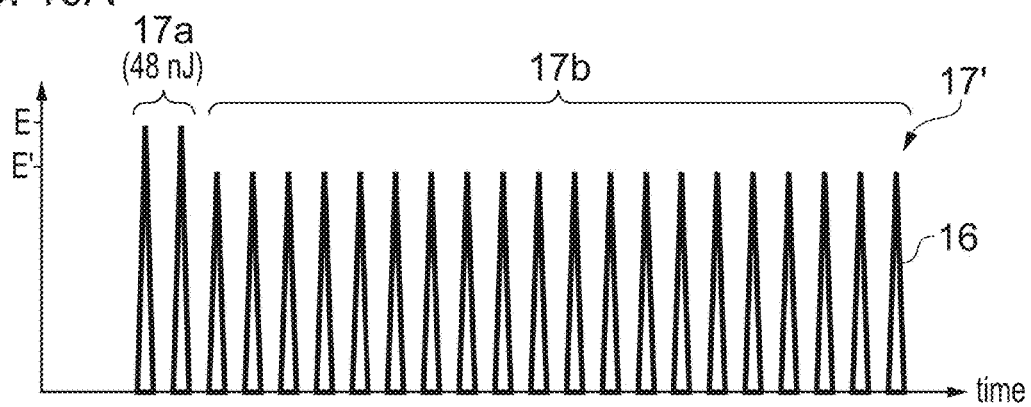
FIG. 10A shows a temporal profile of a pulse energy modulated group of optical pulses according to an example method.

FIG. 10A shows a first example PEM pulse group. The group 17' comprised a total of 20 pulses 16 at a repetition rate of 10 MHz, and divided into a first subgroup 17a and a second subgroup 17b. The first subgroup 17a comprised the initial two pulses, which each had a higher energy E of 48 nJ per pulse ("stronger" pulses). The second subgroup 17b comprised the final 18 pulses, which each had a lower energy E', less than E ("weaker" pulses). The value of E', while kept constant within any individual pulse group 17', was varied over a range of 43 nJ per pulse to 14 nJ per pulses to create different pulse groups 17', in order to investigate the properties of PEM.

Figure 10B:
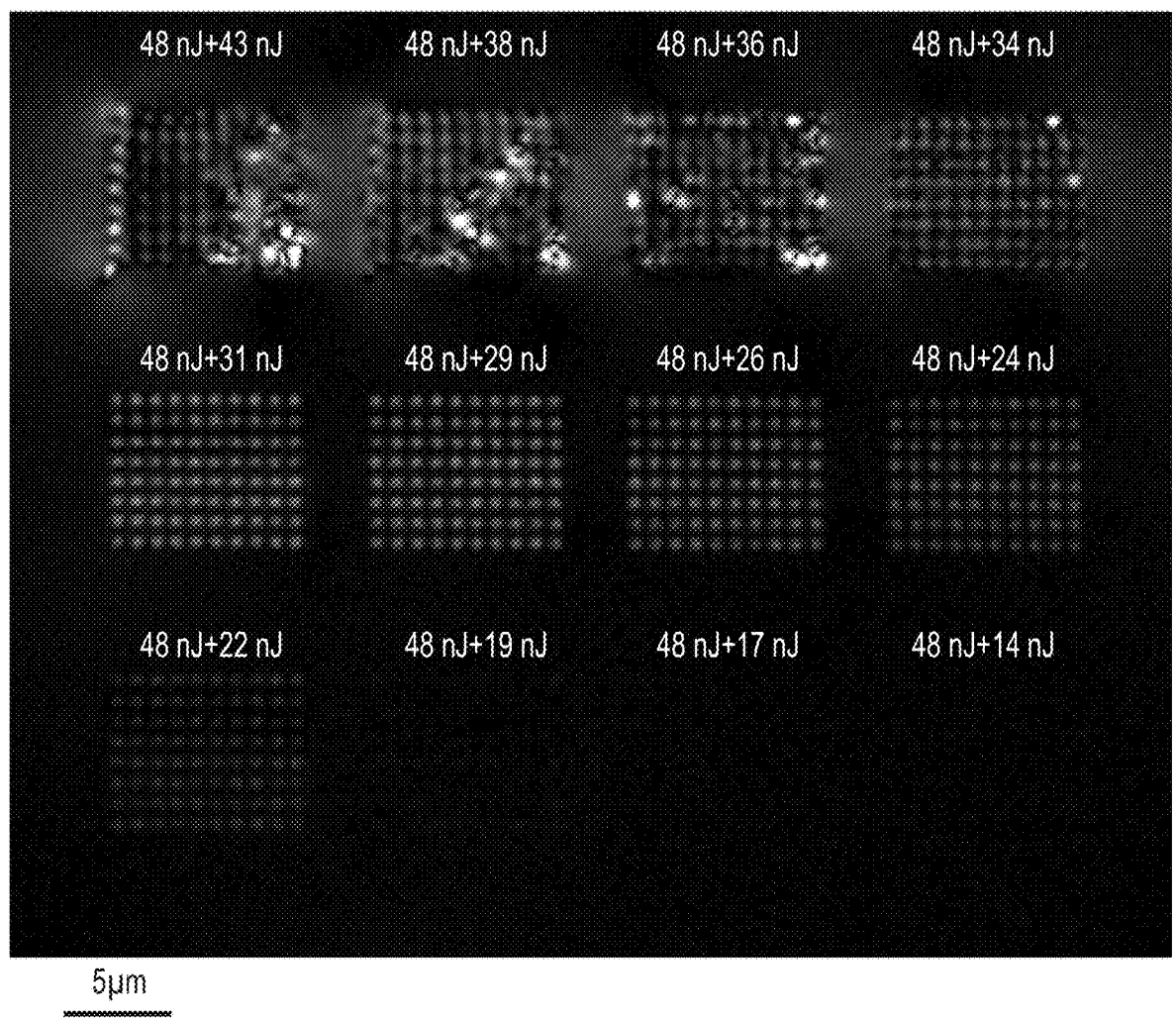
FIG. 10B shows a retardance image of birefringence in a substrate written with nanostructures using different energy pulse groups configured as in FIG. 10A.

FIG. 10B shows a retardance image of birefringence in a silica substrate into which arrays of dots or voxels were written using the various PEM pulse groups 17'. Starting at the array in the upper left corner, the lower energy E' of the second subgroup 17b of pulses was set successively to 43 nJ, 38 nJ, 36 nJ, 34 nJ, 31 nJ, 29 nJ, 26 nJ, 24 nJ, 22 nJ, 19 nJ, 17 nJ, and 14 nJ. The arrays in the top row, for values of E' of 34 nJ and above, show that at these relatively large energy levels for the weaker pulses, voxels were created but significant thermal damage also occurred (the temperature increase induces a stress into the material, causing the damage). However, the arrays in the second row and the start of the bottom row, for values of E' between 31 nJ and 22 nJ, show that at intermediate energy levels for the weaker pulses, clear and distinct birefringent voxels free from stress-induced thermal damage were created. The remaining arrays in the bottom row, for value of E' of 19 nJ and below, show that for low energy levels for the weaker pulses, insufficient energy is delivered to the substrate from the 20-pulse group to create distinct and usable nanostructures.

These results indicate that PEM is an effective technique for enabling the use of high pulse repetition rates for nanostructure writing, when the relative pulses energies are chosen appropriately such that the lower pulse energy in the latter part of the pulse group is at an intermediate level, neither too close to nor too far from the higher pulse energy of the strong initial pulses. This provides a way to increase data writing rates.

Further PEM pulse groups were formulated and used to write voxel arrays into silica substrates in order to investigate the effect of different values of the stronger pulse energy E of the pulses in the first subgroup.

FIG. 11A shows a second example PEM pulse group. The group 17' comprised, as in the FIG. 10A example, a total of 20 pulses 16 at a repetition rate of 10 MHz, and divided into a first subgroup 17a and a second subgroup 17b. The first subgroup 17a comprised the initial two pulses, which each had a higher energy E of 36 nJ per pulse. The second subgroup 17b comprised the final 18 pulses, which each had a lower energy E', less than E ("weaker" pulses). Using the results shown in FIG. 10B, the lower energy E' was chosen to have values of 32 nJ, 29 nJ, 27 nJ and 25 nJ, in other words, values in the intermediate energy range found to produce good quality nanostructures without damage. However, owing to the reduced level of the stronger pulse energy in the first subgroup, the weaker pulse energies in the second subgroup were less well separated from the stronger pulse energy in these examples. The groups could be considered to be closer to a non-PEM regime.

FIG. 11B shows a retardance image of birefringence in a silica substrate into which four arrays of voxels were written using various PEM pulse groups described with respect to FIG. 11A. From this, it can be seen that the induced birefringence was weak and unclear at all values of E', likely owing to the reduced value of E. From the results of FIGS. 10 and 11, we deduce that clear birefringent nanostructures can be written with high pulse repetition rates by using PEM to provide a sufficiently large, strong initial pulse energy and secondary, weaker pulse energy that is intermediate compared to the stronger pulse energy.

Further experiments of this type were performed, and the resulting irradiated regions observed to categorise them according to whether clear birefringent nanostructures had been formed, or thermal damage had been caused, or no structural modification giving birefringence had been induced.

FIG. 12 shows a graph depicting these observations. The weaker pulse energy E' in the second subgroup 17a of a PEM pulse group is plotted against the vertical axis, and the stronger pulse energy E in the first subgroup 17b is plotted against the horizontal axis, and the resulting data point designated as "damage", "birefringent" or "no modification or birefringence" according to observation of the substrate. From this, the energy region demarcated by the axes is divided into regions corresponding to these categories. For the pulse parameters in question, the graph reveals that there is an energy zone or window in which successful formation of clean and undamaged birefringence can be achieved with a stronger energy of about 36 nJ and above, and a weaker energy in the range of about 22 nJ to 31 nJ.

As discussed above, with pulse repetition rates of 1 MHz, the translation speed of the substrate used to write voxel arrays is limited to a maximum of about 50-60 mm/s, because higher speeds cause an increasingly large inaccuracy in the value of the birefringence azimuth (see FIG. 5). The use of PEM allows higher pulse repetition rates to be employed, which in turn allows the translation speed to be increased, also as discussed above. Experiments have been conducted to demonstrate this.

Figure 13:
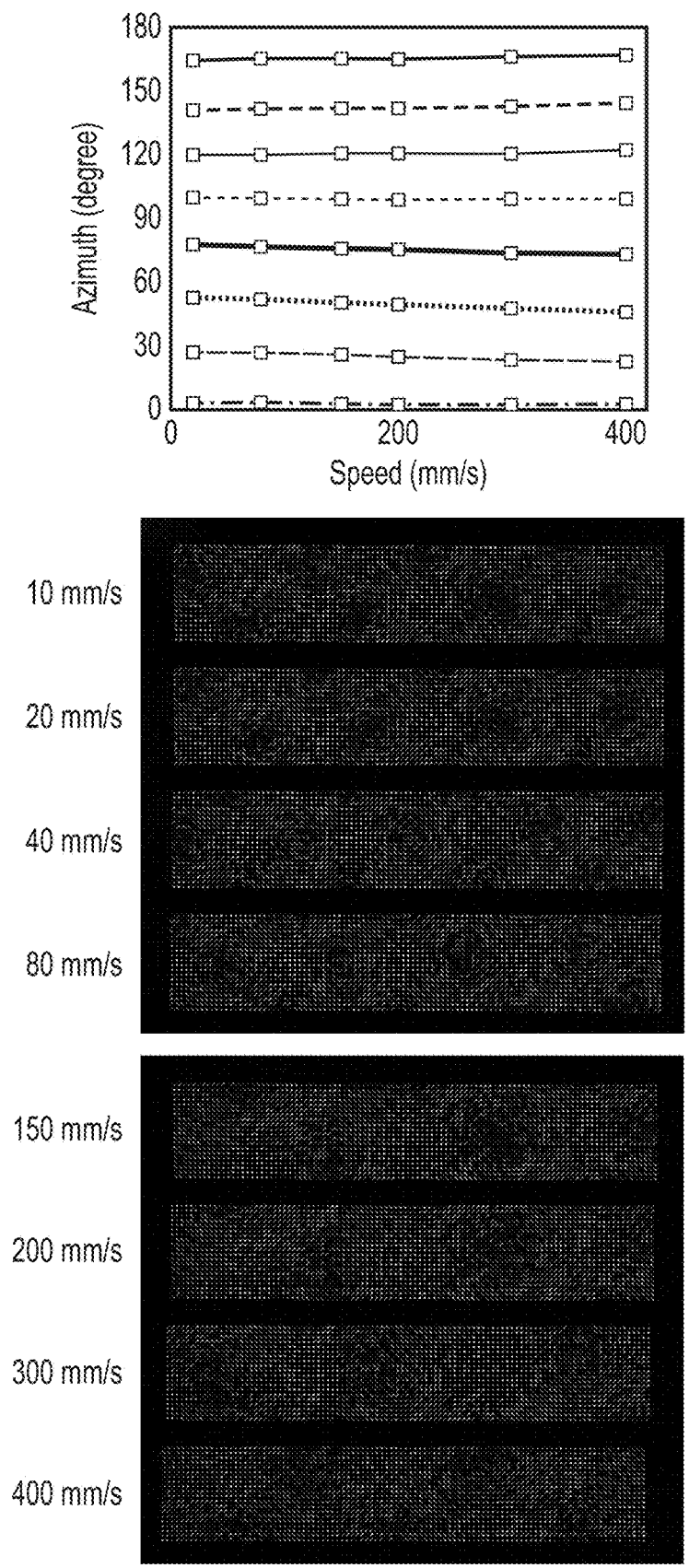
FIG. 13 shows a graph of the birefringence slow axis azimuth of nanostructures written into substrates using example methods of the present disclosure, for increasing speed of writing multiple nanostructures, together with a birefringence images of substrates with nanostructures written at some of the various speeds.

FIG. 13 shows the results of these experiments. The upper part of FIG. 13 shows a graph of measured birefringent slow axis orientation (azimuth, vertical axis) of dots written into silica glass, at different values of translation speed (horizontal axis). Dots with different values of intended birefringence azimuth ranging from about 5° to 170° were recorded at a range of translation speeds from 10 mm/s to 400 mm/s, using PEM and a pulse repetition rate of 10 MHz. As can be seen, the azimuth values remain virtually constant, and therefore highly accurate, at all translation speeds. An increase in translation speed is not detrimental to azimuth accuracy, indicating that PEM high repetition rate regime is effective for enabling higher data writing rates.

Note that the translation speed of 400 mm/s shown in FIG. 13 was the maximum performance available from the translation stage used in the experiments. It is expected that the azimuth accuracy will endure up to about ten times the maximum usable translation speed from the 1 MHz pulse repetition, commensurate with the ten-fold increase in repetition rate to 10 MHz. In other words, successful data writing at translation speeds of 4000 mm/s is expected for the described pulse parameters.

The lower part of FIG. 13 shows birefringence images of silica substrates into which voxels were written using translation speeds in the range shown in the graph. From this it can be appreciated that the quality of the voxels and range of birefringence values remains good at all translation speeds, and does not decrease with increasing translation speed even up to 400 mm/s (compare with FIG. 5).

Returning to the energy window for birefringence formation described with respect to FIG. 12, it can be understood that the pulse energy in the first subgroup of pulses should be larger than the pulse energy in the second subgroup of pulses in order to successfully create birefringent nanostructures without damage. Also, when the pulse energy in the first subgroup is not large enough, the generated birefringence is too weak to be useful. This suggests that the strong energy of the first few pulses may be a significant factor in enabling birefringence formation, while the energy strength does not need to be maintained throughout the pulse group and successful birefringence can be achieved with a reduced pulse energy for later pulses, which also avoids thermal damage. While not yet fully understood, this supposition suggests a possible mechanism for birefringent nanostructure creation.

FIG. 14 shows highly schematic diagrams of possible stages in the formation of birefringent nanostructures using PEM pulse groups. FIG. 14A shows a side view of the beam 14 focussed to a spot 22 inside the substrate 24 during delivery of the higher energy pulses in the first subgroup 17a of the PEM pulse group. The inset shows the substrate 24 from above (in other words, along the beam propagation direction), in which a void-like structure 30 (nanopore or nanovoid) has been formed. Formation is by provision of sufficient optical energy (from the first pulses at high energy) to generate a shock wave in the substrate material of a pressure large enough to overcome the material's tensile strength. Initially, the void is substantially spherical, and therefore isotropic and lacking in birefringence. FIG. 14B shows the subsequent delivery of the lower energy pulses in the second subgroup 17b of the PEM pulse group, to the focussed spot 22 in the substrate 24. As shown in the inset (again, a view from above), the subsequent optical energy delivered at a lower level per pulse is able to cause elongation of the nanopore 30 and hence create optical anisotropy. Photoexcitation at the spherical nanopore 30 by the polarised lower energy laser pulses may generate an anisotropic temperature distribution, which might cause elongation of the void in a direction perpendicular to the polarisation direction of the laser pulses (indicated by the arrow in FIG. 14B), to form an oblate spheroidal nanopore 30a. FIG. 14C shows a scanning electron microscope image of an elongated void or nanopore 30a formed in a silica substrate, oriented perpendicular to the optical polarisation direction of applied femtosecond laser pulses at 515 nm. This supports the proposed mechanism.

In general, therefore, the methods proposed herein allows the application of pulsed optical energy to a substrate in a way that can reduce thermal damage, increase the rate at which energy can be applied to different regions in the substrate, and/or enable particular processing of the substrate to be achieved with fewer pulses, depending on the process. Overall, a method that enables these effects can be summarised as the application to a region in a substrate of a temporal group or train of optical pulses, the group comprising a first subgroup with a first pulse energy and a second subgroup with a second pulse energy lower than the first pulse energy.

FIG. 15 is a flow chart showing steps in an example method described herein. The method may be broadly described as a method of delivering optical energy to a substrate (for example to create a birefringent (optically anisotropic) nanostructure). In a first step S1 a beam from a source of femtosecond optical pulses (laser pulses) is focussed and directed to a region in a substrate where the pulses are required. In a second step S2, a temporal group of the pulses is applied to the region, where the temporal group comprises a first subgroup of pulses followed by a second subgroup of pulses. In a third step S3, as the temporal group is applied, the pulse energies are controlled so that the pulse energy of the individual pulses in the second subgroup is less than the pulse energy of the individual pulses in the first subgroup.

In some examples, the application of the pulses as an energy-controlled temporal group may be repeated at multiple regions in the substrate, for example in a spaced-apart array in order to create data-encoding birefringent voxels in an optical element.

The temporal group overall may comprises up to about twenty pulses. In order to accommodate both subgroups, the group may comprise between six and twenty pulses, for example, or between eight and twenty pulses, or between ten and twenty pulses. Smaller pulse groups are applicable also, and can allow the time for writing a single data voxel to be reduced. For example, the group may comprise between six and eighteen pulse, or between six and fifteen pulses, or between eight and fifteen pulses, or between six and ten pulses, or between eight and twelve pulses, for example.

While the experimental results presented above typically include a first subgroup of two pulses, in some case, a single pulse in the first subgroup may be able to deliver sufficient energy to create the initial nanovoid, while in other cases more than two higher energy pulses may be used. Typically, the first subgroup may include one, two or three pulses, so that the first subgroup comprises up to three pulses. Larger sizes of first subgroup might also be used, such as four pulses or five pulses, particularly for larger overall pulse groups.

While the proposed methods are useful for enabling the use of higher pulse repetition rates, they are also applicable to lower rates. Overall, the methods are considered particularly useful with pulse repetition rates in the range of 1 MHz to 10 MHz, although rates below 1 MHz and above 10 MHz may be used if desired, for example up to 15 MHz, or up to 20 MHz, or up to 30 MHz, or up to 50 MHz. In somewhat slower repetition rates, the rate may be in the range of 1 MHz to 4 MHz, for example, whereas for higher repetition rates, the rate may in the range of 4 MHz to 10 MHz. Rates in an intermediate range are not excluded either, such as in the range of 2 MHz to 7 MHz.

As discussed above, useful results can be obtained for a second energy for the second pulse subgroup which is an intermediate fraction or proportion of the higher first energy for the first pulse subgroup, in other words, not too close to not too remote from the first energy. Considering the ranges for the first energy and the second energy derivable from FIG. 12, and rounding to the nearest 5%, in some examples the second energy is selected to be in the range of 35% to 85% of the first energy. For example, the range for the second energy might be between 35% and 75%, or 35% and 65%, or 35% and 55%, or 35% and 45%, or 45% and 75%, or 45% and 65%, or 45% and 55%, or 55% and 75%, or 55% and 65%, or 65% and 75%.

In any of these proportions for the two energies, the first energy might be, for example, 36 nJ per pulse or above. For example, it might be at least 38 nJ per pulse, or at least 40 nJ per pulse, at least 42 nJ per pulse, at least 44 nJ per pulse, or at least 46 nJ per pulse, or at least 48 nJ per pulse, or at least 50 nJ per pulse, or at least 45 nJ per pulse, or at least 60 nJ per pulse. In a particular example, the first energy may be 36 nJ or higher, and the second energy may be in the range of 65% to 85% of the first energy, for example between about 23 nJ and 30 nJ or about 22 nJ to 31 nJ if the first energy is about 36 nJ, for example between 35 nJ and 37 nJ.

In another example, the first energy might be in the range of about 36 nJ to about 64 nJ, such as between 38 nJ and 64 nJ, between 40 nJ and 64 nJ, between 42 nJ and 64 nJ, between 45 nJ and 64 nJ, between 50 nJ and 64 nJ, between 55 nJ and 64 nJ, between 60 nJ and 64 nJ, between 40 nJ and 60 nJ, between 40 nJ and 55 nJ, between 40 nJ and 50 nJ, between 40 nJ and 45 nJ, between 45 nJ and 64 nJ, between 45 nJ and 60 nJ, between 45 nJ and 55 nJ between 45 nJ and 50 nJ, between 50 nJ and 64 nJ, between 50 nJ and 60 nJ, between 50 nJ and 55 nJ, or between 55 nJ and 64 nJ.

In any of these ranges (or other ranges), the second energy might be, for example, in the range of 35% to 50% of the first energy. For example, if a relatively large first energy of 64 nJ is chosen, this range corresponds to a second energy in the range of about 22 nJ to 31 nJ.

The experimental results presented above were obtained using laser pulses at a wavelength of 515 nm, but the invention is not limited in this regard. While wavelengths around this value, such as in the range of 500 nm to 530 nm, may be useful, longer or shorter wavelengths are not excluded, such as in the range of 450 nm to 550 nm, 400 to 600 nm, 400 to 700 nm, or longer wavelengths up to and including infrared wavelengths such as in the range 400 nm to 1100 nm.

In particular, pulse energies outside of the example ranges given above may be appropriate for other wavelengths, in particular having regard to the material of the substrate, and the amount of optical energy needed to form nanovoids therein. This is true also for other pulse durations and focussing regimes, discussed further below.

More generally, the wavelength of the laser beam may be at or around 1030 nm, such as within the range of 1000 nm to 1060 nm. Other wavelengths may also be used, including the shorter wavelengths mentioned above such as at or around 515 nm and at or around 343 nm. Hence, the wavelength might be chosen in the range of 340 nm to 1100 nm. Other smaller ranges may be appropriate depending on the other operating parameters, such as in the range of 300 nm to 1000 nm, 400 nm to 1000 nm, 500 nm to 1000 nm, 600 nm to 1000 nm, 700 nm to 1000 nm, 800 nm to 1000 nm, 900 nm to 1000 nm, 300 nm to 900 nm, 400 nm to 900 nm, 500 nm to 900 nm, 600 nm to 900 nm, 700 nm to 900 nm, 800 nm to 900 nm, 300 nm to 800 nm, 400 nm to 800 nm, 500 nm to 800 nm, 600 nm to 800 nm, 700 nm to 800 nm, 300 nm to 700 nm, 400 nm to 700 nm, 500 nm to 700 nm, 600 nm to 700 nm, 300 nm to 600 nm, 400 nm to 600 nm, 500 nm to 600 nm, 300 nm to 500 nm, 400 nm to 500 nm or 300 nm to 400 nm, or any of 300 nm, 400 nm, 500 nm, 600 nm, 700 nm, 800 nm, 900 nm or 1000 nm to 1060 nm or 1100 nm or 1200 nm. Alternatively, the ranges may extend down to 200 nm in some examples. Longer wavelengths may also be used, so that the upper end of the above-listed ranges might instead be 1300 nm, or 1400 nm, or 1500 nm, or 1600 nm, or 1700 nm, or 1800 nm, or 1900 nm, or 2000 nm, or 2100 nm, or 2200 nm, or 2300 nm, or 2400 nm, or 2500 nm. Overall, therefore, the wavelength might lie in the range of 200 nm to 2500 nm. Any suitable laser source can be used to generate the writing beam, but a Ti:sapphire laser, operating to generate a femtosecond output tuneable within the wavelength range of 650 nm to 1100 nm may be used. Also, higher harmonics of this near-infrared range could be used to provide shorter wavelengths such as 515 nm. Another example laser is an ytterbium-doped potassium gadolinium tungstate regenerative amplified laser, modelocked to provide pulses in the femtosecond domain. Other lasers and optical sources operable in the visible and/or near-infrared spectral range could also be used.

The results discussed above were obtained by focussing the laser pulses with a lens of numerical aperture (NA) of 0.6. Relatively tight focussing of this scale may be useful, but other levels of focussing are not excluded, such as NA in the range 0.55-0.65, or 0.5-0.7, or 0.4-0.8, or focussing outside these ranges if appropriate.

Pulses of duration in the range of 200-280 fs were used to obtain the results discussed above, but other pulse durations may be chosen in order to vary the power and/or energy delivered to the substrate. Examples include pulses in the range of 300 to 900 fs, 300 to 400 fs, 300 to 500 fs, 300 to 600 fs, 300 to 700 fs, 300 to 800 fs, 400 to 500 fs, 400 to 600 fs, 400 to 700 fs, 400 to 800 fs, 400 to 900 fs, 500 to 600 fs, 500 to 700 fs, 500 to 800 fs, 500 to 900 fs, 600 to 700 fs, 600 to 800 fs, 600 to 900 fs, 700 to 800 fs, 700 to 900 fs, or 800 to 900 fs. Pulses shorter than 300 fs or longer than 900 fs may also be suitable. For example the pulse duration may be as short as 100 fs or 200 fs, or as long as 1000 fs, so that the duration is chosen to be in a range with a lower limit of 100 fs or 200 fs, and an upper limit of 300 fs, or 400 fs, or 500 fs, or 600 fs, or 700 fs, or 800 fs, or 900 fs, or 1000 fs.

Silica has been mentioned as a suitable material for the optically transparent substrate, but other materials may also be used. The bulk material of a substrate used to form an optical element using the proposed method should be a transparent material, meaning that it has a significant transmission for at least some wavelengths across the spectrum from ultraviolet to the near-infrared (roughly 200 nm to 2500 nm). It should have a high transparency at the wavelength used for the writing laser pulses, and also for the intended light beams to be used with the finished optical element (for reading stored optical data, or to be optically transformed or manipulated by the element). Usefully, the material may be an amorphous glass material. For example, it may be silica (silicon dioxide, $SiO_2$), including fused silica. The silica or other glass material might be doped with other materials to modify its optical properties. Examples of doped or multicomponent glasses may include materials such as $Al_2O_3$, $B_2O_3$, alkaline earth oxides and $Na_2$/$K_2O$ but other elements and compounds may be used; the disclosure is not limited in this regard. Other materials for the optical element may be any material able to support the laser induced nanostructures, including materials in which nanogratings such as a type II modification or a type X modification have previously been demonstrated. These include multicomponent glasses, $GeO_2$ glass, porous glass, aerogel glass, silicon and silicon materials, semiconductor materials, lithium niobate and other lithium oxide compounds. Other materials are not excluded, however. In the case of doped silica or other materials, the parameters of the laser pulses may require selection to take account of the physical properties of the material, in particular the bandgap and the thermal properties. The nanostructures are formed so as to be embedded within the volume of the material of the optical element. They can be formed in single layer, with a thickness of the layer being in a range of about 50 μm to about 500 μm. Control of the laser pulse parameters and the focussing can create a plurality of layers at different depths in the element (i.e. at different positions along the length of the propagation direction of the seeding and writing pulses). As an example, the optical element may have a thickness on this direction of about 3 mm, although thicker and thinner dimensions can of course be used as convenient.

As noted above, the methods are applicable in other contexts where multiple laser pulses are used for irradiation, so that substrates (wherein the substrate may be, for example, a substrate to be processed into an element of some form, or a workpiece requiring processing such as welding or cutting) may have other characteristics than those noted above. If the method is not used to form an optical element, the material need not be transparent, for example.

Typically, the methods can be implemented by use of a controller, such as a programmable processor, which is operable to control the output of the optical source (ultrafast laser) in order to deliver femtosecond pulses in the required bursts to make up each pulse group and to control the power on a pulse-by pulse basis in order to switch between the first and second energies, and also to control the polarisation in order to create nanostructures with appropriate birefringence properties (which the method is used to make birefringent nanostructures). If the pulse groups are required to be delivered subsequently to multiple locations, regions or positions within the substrate, the controller can control the relative movement between the beam and the substrate in order to synchronise the pulse group delivery with the beam impinging on each region in turn. The skilled person will be aware of techniques to implement control of power, polarisation, pulse delivery and movement; any convenient approach may be used.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] P G Kazansky, H Inouye, T Mitsuyu, K Miura, J Qiu, K Hirao and F Starrost, Phys. Rev. Lett., vol. 82, 2199-2102, 1999
[2] J Zhang, M Gecevičius, M Beresna, P G Kazansky, Phys. Rev. Lett., vol. 112(3), 33901, 2014
[3] E Bricchi, B G Klappauf, P G Kazansky, Opt. Lett., vol. 29, 119-201, 2004
[4] S S Fedotov, A G Okhrimchuk, A S Lipatiev, A A Stepko, K I Piyanzina, G Y Shakhgildyan, M Y Presniakov, I S Glebov, S V Lotarev and V N Sigaev, Opt. Lett., vol. 43(4), 851, 2018
[5] WO 2019/158910

The invention claimed is:

1. A method of delivering optical energy to a substrate, comprising:
applying a temporal group of optical pulses to a region of the substrate, wherein the temporal group comprises twenty or fewer pulses of a femtosecond pulse duration, arranged as a first subgroup of pulses comprising up to three pulses followed by a second subgroup of pulses comprising the remaining pulses in the temporal group; and wherein
energies of the pulses are controlled such that pulses in the first subgroup have a first energy per pulse and pulses in a second subgroup of pulses have a second energy per pulse which is less than the first energy.

2. A method according to claim 1, in which the substrate comprises a transparent material, and the optical energy is delivered to create an optical anisotropic birefringent nanostructure in the region.

3. A method according to claim 2, further comprising applying additional temporal groups of the optical pulses to other regions of the substrate, the regions spaced apart in an array, and the optical pulses in each temporal group having properties selected to define a particular birefringence slow axis orientation and/or a particular birefringence retardance value for the nanostructure in the corresponding region.

4. A method according to claim 3, comprising defining the birefringence slow axis and the birefringence retardance value for each nanostructure so as to encode data in each nanostructures, the substrate comprising an optical data storage element.

5. A method according to claim 3, in which applying additional temporal groups of the optical pulses to other regions of the substrate comprises:

causing continuous relative movement between the substrate and an optical beam comprising the optical pulses which is focussed and directed onto the substrate; and applying successive temporal groups of the optical pulses when the relative movement aligns the focus of the optical beam with the other regions of the substrate.

6. A method according to claim 5, in which the pulse repetition rate is about 1 MHz, and the relative movement has a speed up to about 60 mm/s.

7. A method according to claim 5, in which the pulse repetition rate is about 10 MHz, and the relative movement has a speed in the range of 60 mm/s to 600 mm/s.

8. A method according to claim 1, in which the temporal group comprises between six and twenty pulses.

9. A method according to claim 8, in which the temporal group comprises between eight and fifteen pulses.

10. A method according to claim 1, in which the first subgroup comprises two pulses or three pulses.

11. A method according to claim 1, in which the temporal group has a pulse repetition rate in the range of 1 MHz to 10 MHz.

12. A method according to claim 11, in which the pulse repetition rate is in the range of 1 MHz to 4 MHz.

13. A method according to claim 11, in which the pulse repetition rate is in the range of 4 MHz to 10 MHz.

14. A method according to claim 1, in which the pulse duration is in the range of 200 fs to 300 fs.

15. A method according to claim 1, in which the second energy is in the range of 35% to 85% of the first energy.

16. A method according to claim 1, in which the first energy is 36 nJ or above.

17. A method according to claim 16, in which the second energy is in the range of 65% to 85% of the first energy.

18. A method according to claim 17, in which the second energy is in the range of 22 nJ to 31 nJ.

19. A method according to claim 1, in which the first energy is in the range of 36 nJ to 64 nJ.

20. A method according to claim 19, in which the second energy is in the range of 35% to 50% of the first energy.

21. A method according to claim 1, in which the pulse repetition rate is 10 MHz, the pulse duration is in the range of 200 fs to 280 fs, and the pulses have a wavelength of 515 nm.

22. A method according to claim 1, further comprising applying additional temporal groups of the optical pulses to the substrate to other regions of the substrate.

* * * * *